United States Patent Office 2,875,247
Patented Feb. 24, 1959

2,875,247

REFINING OF TETRACYCLINE ANTIBIOTICS BY DIRECT MASH EXTRACTION

Sidney Martin Fox, Spring Valley, Mitchell Stanley Blicharz, Blauvelt, and Robert Winterbottom, New City, N. Y., assignors to American Cyanamid Company, New York, N. Y., a corporation of Maine No Drawing. Application December 21, 1956
Serial No. 629,773

12 Claims. (Cl. 260—559)

This invention relates to the refining or purification of tetracycline antibiotics. More particularly, the present invention is concerned with an improved process for the extraction of chlortetracycline and tetracycline from fermentation mashes containing the same.

It has been proposed in the past to extract chlortetracycline from fermentation liquors by a process involving acidification of the broth to solubilize the chlortetracycline followed by separation of the mycelia solids by filtration, and extraction of the chlortetracycline from the filtrate with an organic solvent and a surface active agent. The extraction process using organic solvents has heretofore been applied only to the activity-containing filtrates and not to the fermentation mash itself.

It has not heretofore been considered possible to extract chlortetracycline directly from the mash because it was felt that the mycelia solids acted in some manner to tie up the chlortetracycline and thus prevented its ready extraction by solvent means. Consequently, all the prior art procedures have invariably filtered the mash to obtain an activity-containing filtrate prior to any extraction of the chlortetracycline.

The present invention relates to a simplification of the prior art processes whereby it has now been discovered that under certain conditions it is possible to extract chlortetracycline directly from the mash without having to filter the mash to remove the mycelia solids as was heretofore believed to be necessary, and at the same time it has been found that increased yields, amounting to a 10% increase or greater, can be obtained over the extraction of chlortetracycline from the activity-containing filtrate. This increase in yield is due in part to the elimination of the hot acid treatment of the filter cake which was necessary in the prior art process to remove the activity from the cake and which always resulted in some destruction of the activity. The present invention is, therefore, not only economically advantageous because it avoids one step of the prior art which was heretofore thought to be essential, but at the same time it is easy to carry out and results in high yields of pure material, better yields, in fact, than those customarily obtained wherein the chlortetracycline is extracted from the acidified filtrate.

A further advantage of the present invention resides in the fact that it obviates the necessity of handling large volumes of water which were needed in the prior art process. In order to extract the maximum activity into an aqueous filtrate, it is necessary to employ two and one-half volumes of water over the mash volume and even this does not produce complete extraction. On large scale fermentations it can be seen that a tremendous burden is involved in recovery of the chlortetracycline from such an aqueous filtrate.

Still another advantage of the present invention is that it results in high yields of essentially pure material of pharmaceutical grade, that is 95–97% pure. The increased purity may be the result of treatment with a reducing agent as described more in detail hereinafter.

The chlortetracycline produced by the prior art process requires customarily two recrystallizations in acid butanol to bring it up to specification standards.

One further advantage of the pure material produced by this invention is that it may be reduced to tetracycline directly without further recrystallization or purification procedures.

The detailed discussion appearing hereinafter will be principally concerned with the novel process of extracting chlortetracycline directly from chlortetracycline-containing fermentation mash. The invention is, of course, equally applicable in extracting tetracycline from tetracycline-containing mash as will be evident from some of the examples appearing hereinafter, as well as in extracting both antibiotics together from the same mash since it is known that both chlortetracycline and tetracycline are produced in an S. aureofaciens fermentation.

The present invention is preferably carried out by first acidifying the mash to solubilize the chlortetracycline contained therein. The mash is acidified to a pH of about 0.5 to 2.5, and preferably to a pH of 1.3–1.4 with any strong mineral acid such as hydrochloric acid, sulfuric acid, phosphoric acid or the like. This acid treatment is carried out at room temperature. The acidified mash is stirred for a short time to solubilize the chlortetracycline and then a definite quantity of oxalic acid or ammonium oxalate is added so as to adjust the calcium and magnesium ion content of the mash to a predetermined level. In this connection, it has been found that the carrier extraction process about to be described does not function at all well in extracting chlortetracycline from the mash unless the calcium and magnesium ion content of the mash is adjusted to a very definite level. It has been found that if the calcium and magnesium ion content of the mash is adjusted to between about 10 milligrams to 45 milligrams per gram of chlortetracycline present in the mash, satisfactory extraction of the activity from the mash can be obtained. If amounts of these ions much above or below this amount are left in the mash, inefficient extraction of the activity takes place.

Just why this is so is not entirely clear but it has been observed that pure chlortetracycline cannot be extracted into the organic solvent if calcium ions are absent, and if too much calcium ion is present in the mash a heavy precipitate of chlortetracycline forms during the extraction step which is not readily dissolved by the organic solvent. As stated above, however, when the calcium and magnesium ion content of the mash is adjusted within the limits set forth above, the extraction of the chlortetracycline by the organic solvent proceeds smoothly and results in good yields of pure material.

After the precipitation of the desired quantity of ion has been completed so as to adjust the calcium and magnesium content of the mash to the proper degree, to the decalcified mash is then added a suitable quantity of a quaternary ammonium compound as hereinafter more particularly described. In general, the amount of quaternary ammonium compound may range about one-half mole of quaternary per mole of chlortetracycline to about 3 moles of a quaternary per mole of chlortetracycline. The mash is then stirred and the pH of the mash is adjusted to a pH of between 5.5 and 11 and, preferably about 8.4–8.6, with sodium hydroxide. An organic solvent, preferably about 10% of mash volume or greater, is then added to the mixture with agitation. Up to 50% or more of solvent may be used but no particular advantage has thus far been observed with larger amounts and at the higher levels it becomes uneconomical. The mixture is stirred and filtered, preferably with the aid of a filter aid such as diatomaceous earth. The chlortetracycline passes into the solvent phase and the filtrate is allowed to stand until the two phases separate and the solvent phase is then decanted. The filter cake is slurried with fresh solvent and again filtered and the two solvent extracts are pooled for further processing.

A variety of water-immiscible, polar organic solvents may be used in the extraction step. Operable solvents include butanol, and the like. Preferred solvents are methyl alkyl ketones such as methyl butyl ketone, methyl propyl ketone, etc. Especially good results have been obtained with methyl isobutyl ketone because this solvent has been found to be extremely selective in its ability to extract chlortetracycline from the mash and to leave the impurities behind.

The quaternary ammonium compounds useful as carriers in the hereindescribed solvent extraction process may be represented by the following general formula:

wherein $R_1$ is a lower alkyl or benzyl radical, $R_2$ is a long fatty chain of at least 8 carbon atoms, $R_3$ is a lower alkyl radical, $R_4$ is a lower alkyl radical, and $R_1$ and $R_4$ when taken together represent a divalent carbon chain of 2 to 5 carbon atoms. Thus, nitrogen may be part of the heterocyclic ring as in compounds of the Onamine RO type such as those depicted below:

wherein $R_1$, $R_2$, $R_3$ and $R_4$ have the meaning indicated above.

The quaternary ammonium compounds known as the Arquads are particularly effective carriers for the hereindescribed solvent extraction process. These compounds are primarily alkyltrimethylammonium chlorides and may be represented by the formula $R—N(CH_3)_3Cl$ wherein R is a long chain alkyl group having at least 8 carbon atoms.

These particular quaternary ammonium compounds are marketed by Armour and Company under the trade-name "Arquad." A variety of compounds of this class are available varying as to the length and number of long chain alkyl groups attached to the nitrogen atom. Listed below are some representative Arquads which are available commercially and which may advantageously be used in carrying out the present invention.

ARQUADS—AVERAGE COMPOSITION OF ACTIVE INGREDIENTS

| Substituent Groups | Carbon Chain Length | Arquad 12 | Arquad 16 | Arqua 18 |
|---|---|---|---|---|
| | | Percent | Percent | Percent |
| Octyl | 8 | | | |
| Decyl | 10 | | | |
| Dodecyl | 12 | 90 | | |
| Tetradecyl | 14 | 9 | | |
| Hexadecyl | 16 | | 90 | 6 |
| Octadecyl | 18 | | 6 | 93 |
| Octadecenyl | 18 | 1 | 4 | 1 |
| Octadecadienyl | 18 | | | |

| Substituent Groups | Carbon Chain Length | Arquad O | Arquad S | Arquad 2C | Arquad 2HT |
|---|---|---|---|---|---|
| | | Percent | Percent | Percent | Percent |
| Octyl | 8 | 8 | | 8 | |
| Decyl | 10 | 9 | | 9 | |
| Dodecyl | 12 | 47 | | 47 | |
| Tetradecyl | 14 | 18 | | 18 | |
| Hexadecyl | 16 | 8 | 10 | 8 | 30 |
| Octadecyl | 18 | 5 | 10 | 10 | 70 |
| Octadecenyl | 18 | 5 | 35 | | |
| Octadecadienyl | 18 | | 45 | | |

Arquad 16, which is understood to be a long chain alkyltrimethylammonium chloride in which the alkyl groups consist of 90% hexadecyl, 6% octadecyl and 4% octadecenyl is particularly preferred as it seems to be peculiarly selective in giving a purer chlortetracycline product.

Another quaternary ammonium compound that is a useful carrier in this process is the product known as Onamine RO which is sold by Onyx Oil and Chemical Company. It is understood to be an oil-soluble substituted imidazoline derivative containing a long fatty chain in combination with amino and hydroxy groups.

Following the described extraction process, the chlortetracycline may be recovered from the solvent extract in a number of ways. A preferred method is direct acidification to recover the chlortetracycline as a mineral acid salt, i. e., the hydrochloride. In order to accomplish this isolation procedure, to the solvent extract, prepared as described above, there is added about five milliliters of water for each gram of chlortetracycline present in the mash. The mixture is then acidified with concentrated hydrochloric acid to a pH of about 0.4–0.5. After stirring for 18–24 hours to permit crystallization to occur, the chlortetracycline hydrochloride crystals are filtered, washed with water, washed with a lower alkoxy lower alkanol, i. e., 2-ethoxyethanol, and then with a lower alcohol, i. e., isopropanol, and then vacuum dried.

The products obtained by the above-described solvent extraction process are generally of superior quality by all criteria except visual appearance. Apparently some of the colored impurities which would normally be removed by filtration of the acidified mash are carried along in this process, and they impart a greenish or brownish appearance to the crystalline product. This one difficulty which arises as a result of direct mash extraction can be easily eliminated by treatment of the solvent extract with a reducing agent such as sodium hydrosulfite. It is preferred that this treatment be carried out under acid conditions. Therefore, the methyl isobutyl ketone extract, after the addition of water is adjusted to a pH of between about 1 and 4 and preferably about 1.8 with sulfuric acid. It is essential that this acidification be done with an acid which will not cause premature crystallization of the product. Sodium hydrosulfite is then added at a level of about 0.3 to 0.6 gram per 100 milliliters. This range is quite critical in that an excess will tend to cause a brown coloration in the final product. The treated mixture is then vigorously agitated for a short period of time prior to further processing. Acidification to a pH of about 0.5 is then effected by the addition of concentrated hydrochloric acid. Approximately 0.5 gram of sodium chloride per 100 milliliters of methyl isobutyl ketone extract are then added to compensate for the chloride ion which is lacking by virtue of the preliminary acidification with sulfuric acid. The mixture is then permitted to age and the crystals are recovered as described above in connection with the isolation step.

The invention is not limited to sodium hydrosulfite as the reducing agent as other reducing agents such as sulfur dioxide, sodium sulfite, etc., may also be used.

The extraction and isolation procedures described above in connection with chlortetracycline-containing mashes can be applied virtually without change in recovering tetracycline from tetracycline-containing mashes, as well as in recovering both antibiotics from the same mash. The general conditions of extraction, i. e., pH, solvent ratio, quantities of carrier, etc., have in general been found to be essentially similar to those described in detail in conjunction with the extraction of chlortetracycline directly from the mash.

It has been found, however, that while the chlortetracycline produced by direct mash extraction needs treatment with a reducing agent in order to produce a product of satisfactory visual appearance, no such treatment is required in the case of tetracycline. The process of direct mash extraction of tetracycline when carried out under the above described preferred operating conditions generally yields a product of satisfactory visual appearance in the absence of treatment with a reducing agent. This has been found to be particularly true when the mash is processed shortly after harvesting and is not allowed to stand for a considerable period of time prior to extraction.

Tetracycline may be isolated from the solvent extract by direct acidification to recover tetracycline hydrochloride in essentially the same manner as has been described in connection with the preferred method for recovering chlortetracycline from the solvent extract. In addition, tetracycline may be isolated as the free base by contacting the methyl alkyl ketone extract of tetracycline with acidulated water at a pH within the range of 1.5–2.0, separating the resulting aqueous phase containing the tetracycline from the solvent phase, adjusting the pH of the aqueous phase to within the range of 2–4, and recovering tetracycline neutral by crystallization from the aqueous phase. This process, and which is more particularly described and claimed in the copending application of Mendelsohn, Serial No. 599,339, filed July 23, 1956, now abandoned, is particularly advantageous in producing products of superior color value.

Another procedure for isolating tetracycline from the solvent extract, and which may be used to advantage herein, involves contacting the solvent extract with aqueous urea and separating the tetracycline as a tetracycline-urea compound from which pure tetracycline can be regenerated with ease. The process, and which forms the subject matter of the copending application of Smith et al., Serial No. 584,168, filed May 11, 1956, affords an excellent way of isolating the tetracycline from the solvent extract.

The antibiotic crystals produced by the foregoing isolation process are ordinarily in the range of 97–100% pure tetracycline neutral and can be converted to specification quality tetracycline hydrochloride by a simple, one-step process involving slurrying the tetracycline neutral with butanol, 2-ethoxyethanol and hydrochloric acid.

The invention will be described in greater detail in conjunction with the following specific examples.

*Example 1*

DIRECT MASH EXTRACTION OF CHLORTETRACYCLINE

A three kilogram portion of chlortetracycline mash assaying 5800 gammas per milliliter is adjusted to pH 1.4 by the addition of 25% sulfuric acid. After stirring for 30 minutes, 75 grams of ammonium oxalate monohydrate is added and the mixture is stirred for 45 minutes. To the mixture is added 54 milliliters of Arquad 16 as a 50% isopropanol solution, and the pH is adjusted to 8.5 with 25% sodium hydroxide. The mash is then extracted by stirring vigorously for 20 minutes with 600 milliliters of methyl isobutyl ketone. To the mixture is added 120 grams of Hyflo and the mixture is filtered. The filtrate is permitted to settle for 3 hours after which the solvent phase is separated. The filter cake is reslurried in 450 milliliters of methyl isobutyl ketone, filtered, and rinsed with 50 milliliters of methyl isobutyl ketone. The solvent extracts are combined to give a total volume of 980 milliliters assaying 16,000 gammas per milliliter, representing a recovery of 90.2%.

*Example 2*

RECOVERY OF CHLORTETRACYCLINE HYDROCHLORIDE

To 654 milliliters of methyl isobutyl ketone extract prepared as in Example 1, assaying 16,000 gammas per milliliter, is added 65 milliliters of water, and the pH is adjusted to 0.5 by the addition of 8 milliliters of concentrated hydrochloric acid. The mixture is stirred at room temperature for 17 hours, after which the resulting crystals are filtered, washed with 15 milliliters each of water, 2-ethoxyethanol and isopropanol, and vacuum dried at 40° C. for 16 hours. A yield of 9.74 grams of chlortetracycline hydrochloride assaying 987 gammas per milligram is obtained, representing an over-all yield of 82% from the mash. The product, which is light greenish brown in appearance, has an $E_{1cm}^{1\%}$ of 0.13 at 460 millimicrons

*Example 3*

TREATMENT WITH REDUCING AGENT

To 100 milliliters of methyl isobutyl ketone extract prepared as in Example 1, assaying 17,800 gammas per milliliter, is added 15 milliliters of water and the pH is adjusted to 1.8 with 25% sulfuric acid. To the mixture is added 0.3 gram of sodium hydrosulfite and the mixture is stirred vigorously for 10 minutes, after which the pH is adjusted to 0.5 with concentrated hydrochloric acid. To supply additional chloride ion, 0.5 gram of sodium chloride is added. The mixture is stirred for 20 hours, filtered, washed with water, 2-ethoxyethanol and isopropanol, and vacuum dried. A yield of 1.68 grams of chlortetracycline hydrochloride assaying 973 gammas per milligram is obtained, representing a step yield of 92%. The product, which is bright yellow in appearance, has an $E_{1cm}^{1\%}$ of 0.22 at 460 millimicrons

*Example 4*

DIRECT MASH EXTRACTION OF TETRACYCLINE

To 2 liters of tetracycline mash assaying 6200 gammas per milliliter, is added 40 grams of oxalic acid to adjust the pH to 1.5, and the mixture is stirred for 30 minutes. On the basis of mash potency, 24 milliliters (1 equivalent) of Arquad 16 is added as a 50% solution in isopropanol. After stirring for 15 minutes, 400 milliliters of methyl isobutyl ketone is added and the pH is adjusted to 9.5 with sodium hydroxide. The mixture is stirred vigorously for 20 minutes, after which 80 grams of Hyflo is added and the mixture is filtered. The solvent extract is thereafter separated from the spent aqueous phase. The filter cake is reslurried in the spent aqueous phase and 200 milliliters of fresh methyl isobutyl ketone is added thereto. After stirring for 30 minutes the mixture is filtered and the extract is separated. The combined extracts, totaling 575 milliliters, assay 18,600 gammas per milliliter, representing a yield of 87.8%.

*Example 5*

WATER WASH OF METHYL ISOBUTYL KETONE EXTRACT

A 555 milliliter portion of methyl isobutyl ketone extract prepared as in Example 4 is washed with 272 milliliters of water previously adjusted to a pH of 9.5 with sodium hydroxide, by stirring for 20 minutes and separating. The washed extract, 520 milliliters, assays 19,450 gammas per milliliter, a step yield of 98.3%.

*Example 6*

BACK WATER EXTRACTION OF WASHED SOLVENT EXTRACT

To 500 milliliters of methyl isobutyl ketone extract prepared as in Example 5 is added 150 milliliters of water and the pH is adjusted to 1.2 by the addition of sulfuric acid. After stirring for 30 minutes, the phases are separated. The 165 milliliter aqueous extract thereby obtained assays 56,000 gammas per milliliter, representing a step yield of 95%.

*Example 7*

RECOVERY OF NEUTRAL TETRACYCLINE

A 145 milliliter portion of the aqueous extract obtained as in Example 6 is adjusted successively to pH 1.6, 2.0, 2.6, 3.0 and finally 3.6 by the addition of 15% sodium hydroxide, stirring the mixture for 15 to 20 minutes at each level. After aging with agitation at pH 3.6 for 16 hours at room temperature, the crystalline product is filtered, washed with water, and dried in vacuo at 40° C. A yield of 7.4 grams of tetracycline neutral assaying 1003 gammas per milligram is thereby obtained, a step yield of 92.1%. The product so obtained is bright yellow in visual appearance.

Example 8
DIRECT MASH EXTRACTION OF CHLORTETRACYCLINE 1500 milliliters of chlortetracycline mash assaying 6600 gammas per milliliter are adjusted to pH 1.5 with 25% sulfuric acid. 36 grams of ammonium oxalate are added and the mixture is stirred for 45 minutes. To the mixture is added 26 milliliters of Onamine RO[1]. 600 milliliters of methyl isobutyl ketone are added and the pH is adjusted to 8.5 with 25% sodium hydroxide. The mash is stirred for 20 minutes. To the mixture is added 45 grams of Hyflo and the mixture is filtered. The filtrate is permitted to settle and the solvent phase is separated. The filter cake is slurried with 300 milliliters of methyl isobutyl ketone and filtered. The filtrates are combined and the solvent extracts are separated from the aqueous phase to give a total volume of 780 milliliters assaying 10,250 gammas per milliliter, representing a recovery of 77.8%.

Example 9
RECOVERY OF CHLORTETRACYCLINE HYDROCHLORIDE 100 milliliters of water are added to the methyl isobutyl ketone extract of Example 8, and the pH is adjusted to 0.9 with concentrated hydrochloric acid. The mixture is aged for 24 hours, filtered and washed with 1 volume of 2-ethoxyethanol, 1 volume of water and then 1 volume of isopropanol. A yield of 7.2 grams is obtained having an $E_{1cm.}^{1\%}$ of 0.19 at 460 millimicrons

We claim:

1. The process of extracting antibiotic compounds selected from the group consisting of chlortetracycline and tetracycline from fermentation mash containing the same which comprises acidifying the mash with a mineral acid to a pH of between about 0.5–2.5 so as to solubilize the antibiotics contained therein, adding to the mash a compound of the group consisting of oxalic acid and ammonium oxalate so as to reduce the calcium and magnesium ion content of the mash to between about 10 and 45 milligrams per gram of antibiotic in the mash, adding to the decalcified mash from about ½ mole to about 3 moles per mole of antibiotic of a quaternary ammonium compound having the formula:

wherein $R_1$, $R_3$ and $R_4$ are members of the group consisting of lower alkyl radicals and $R_2$ is an alkyl radical of at least 8 carbon atoms, so as to form an antibiotic-quaternary ammonium complex, raising the pH of the mash with alkali to between about 5.5 and 11, contacting the mash with a methyl alkyl ketone solvent so as to extract the antibiotics from the mash, separating the solvent extract, and thereafter isolating the antibiotics from the solvent extract.

2. The process of extracting chlortetracycline from a chlortetracycline-containing fermentation mash which comprises acidifying the mash with a mineral acid to a pH of between about 0.5–2.5 so as to solubilize the chlortetracycline contained therein, adding to the mash a compound of the group consisting of oxalic acid and ammonium oxalate so as to reduce the calcium and magnesium ion content of the mash to between about 10 and 45 milligrams per gram of chlortetracycline in the mash, adding to the decalcified mash from about ½ mole to about 3 moles per mole of chlortetracycline of a quaternary ammonium compound having the formula:

wherein $R_1$, $R_3$ and $R_4$ are members of the group consisting of lower alkyl radicals and $R_2$ is an alkyl radical of at least 8 carbon atoms, so as to form a chlortetracycline-quaternary ammonium complex, raising the pH of the mash with alkali to between about 5.5 and 11, contacting the mash with a methyl alkyl ketone solvent so as to extract the chlortetracycline from the mash, separating the solvent extract, and thereafter isolating the chlortetracycline from the solvent extract.

3. The process according to claim 2 in which the solvent is methyl isobutyl ketone.

4. The process according to claim 3 in which the quaternary ammonium compound is cetyltrimethylammonium chloride.

5. The process according to claim 2 in which the chlortetracycline is isolated from the organic solvent extract by acidifying the extract with a mineral acid, and thereafter recovering chlortetracycline therefrom as a mineral acid salt.

6. The process according to claim 2 which includes adjusting the organic solvent extract to a pH of between about 1 and 4 with sulfuric acid, adding a reducing agent to the acidified extract so as to improve the visual appearance of the final product, isolating the chlortetracycline from the solvent extract by acidifying the extract with hydrochloric acid, and thereafter recovering the chlortetracycline hydrochloride.

7. The process according to claim 6 in which the reducing agent is sodium hydrosulfite.

8. The process of extracting tetracycline from a tetracycline-containing fermentation mash which comprises acidifying the mash with a mineral acid to a pH of between about 0.5–2.5 so as to solubilize the tetracycline contained therein, adding to the mash a compound of the group consisting of oxalic acid and ammonium oxalate so as to reduce the calcium and magnesium ion content of the mash to between about 10 and 45 milligrams per gram of tetracycline in the mash, adding to the decalcified mash from about ½ mole to about 3 moles per mole of tetracycline of a quaternary ammonium compound having the formula:

wherein $R_1$, $R_3$ and $R_4$ are members of the group consisting of lower alkyl radicals and $R_2$ is an alkyl radical of at least 8 carbon atoms, so as to form a tetracycline-quaternary ammonium complex, raising the pH of the mash with alkali to between about 5.5 and 11, contacting the mash with a methyl alkyl ketone solvent so as to extract the tetracycline from the mash, separating the solvent extract, and thereafter isolating the tetracycline from the solvent extract.

9. The process according to claim 8 in which the organic solvent is methyl isobutyl ketone.

10. The process according to claim 9 in which the quaternary ammonium compound is cetyltrimethylammonium chloride.

11. The process according to claim 8 in which the tetracycline is isolated from the organic solvent extract by acidifying the extract with a mineral acid, and thereafter recovering tetracycline therefrom as a mineral acid salt.

12. The process of extracting tetracycline from a tetracycline-containing fermentation mash which comprises acidifying the mash with oxalic acid to a pH of between

---

[1] Onamine RO is sold by Onyx Oil and Chemical Company and is understood to be an oil-soluble substituted imidazoline derivative containing a long fatty chain in combination with amino and hydroxy groups.

about 0.5–2.5 so as to solubilize the tetracycline contained therein and to adjust the calcium and magnesium ion content of the mash to between about 10 and 45 milligrams per gram of tetracycline in the mash, adding to the decalcified mash from about ½ mole to about 3 moles of cetyltrimethylammonium chloride per mole of tetracycline so as to form a tetracycline-cetyltrimethylammonium chloride complex, raising the pH of the mash with alkali to between about 5.5 and 11, contacting the mash with methyl isobutyl ketone so as to extract the tetracycline from the mash, separating the solvent extract, and thereafter isolating the tetracycline from the solvent extract.

References Cited in the file of this patent

UNITED STATES PATENTS

| | | |
|---|---|---|
| 2,734,018 | Minieri et al. | Feb. 7, 1956 |

FOREIGN PATENTS

| | | |
|---|---|---|
| 506,950 | Belgium | Nov. 30, 1951 |
| 461/55 | Union of South Africa | Oct. 19, 1955 |
| 21 416 | Union of South Africa | Oct. 28, 1954 |

OTHER REFERENCES

Van Dyck et al.: Antibiotics and Chemotherapy, vol. 2, (1952), pages 184 to 194.